Patented Mar. 5, 1940

2,192,501

UNITED STATES PATENT OFFICE 2,192,501

PROCESS OF PRODUCING WHITE TITANIUM DIOXIDE PIGMENTS OF PREDETERMINED SUBORDINATE TINTS

Robert M. McKinney, Wilmington, Del., assignor to E. I. du Pont de Nemours and Company, Wilmington, Del., a corporation of Delaware No Drawing. Application March 20, 1936, Serial No. 69,888

6 Claims. (Cl. 134—58)

The present invention relates to controlling the tint of white titanium dioxide pigments and comprises controlling the time at which a calcined titanium dioxide is maintained within the temperature range of 950 to 750° C.

I have found that on maintaining the calcined product in an atmosphere comprising oxygen within the temperature range of 950 to 750° C. for a very short time, for instance, not more than 3 seconds, the subordinate tint tends to be bluish and when this time is prolonged to a few minutes, preferably more than 5 minutes, the subordinate tint changes towards yellow.

Titanium dioxide pigments as are obtained by calcination of titanium dioxide hydrolysates at temperatures of 900 to 1000° are white within the term as usually understood in the pigment industry; that is to say, they are of a reflectance and color at least as good as the standard white pigment, namely, basic carbonate white lead. Within this range of whiteness, however, it is common for experienced workers and pigment users to distinguish slight differences in subordinate tints which usually are within two ranges; namely, a yellowish tint and a bluish tint.

For certain purposes yellowish tints are preferred; in other instances, the pigment user prefers a bluish tint. Usually the subordinate tint of white titanium pigments is graded by comparison of pastes in a light colored linseed oil. The titanium pigments are lightly mulled in the linseed oil to break down aggregates and the smooth pastes so produced are drawn down on a white porcelain palette.

The paste from the standard pigment and the paste from the pigment to be graded are applied side by side on the palette so that they are in contact allowing close comparison. It is further important to have the pastes so drawn down that the surfaces are smooth and not rough or sandy.

The standard pigment is one chosen as being neutral in tint possessing neither a definite bluish nor a definite yellowish tint. The pigment to be tested is then compared with this standard and the degree of blue tint or yellow tint is graded numerically. For example, one degree of blueness represents a small difference from the neutral standard. Two degrees of blueness represents a definite contrast and a higher degree of blueness, e. g., 4B indicates that the pigment is no longer salable for general use. The same degrees of yellowness are graded and again a pigment possessing more than two degrees of yellow is no longer salable for general use.

It has always been considered that the subordinate tint of a white TiO₂ pigment as obtained by calcination depends mainly upon the manner of preparing the raw pigment as submitted to calcination, and upon other unknown factors. I have, however, found that given a standard raw pigment, or hydrolysate, and submitting it to standard calcination conditions, the subordinate tint can be greatly varied and controlled by controlling the time at which the pigment, during cooling, is kept in an atmosphere containing oxygen, such as atmospheric air, within the temperature range from the calcining temperature down to approximately 750° C. For instance, if a pigment is calcined at 950° C. and allowed to fall through a current of cold air so as to chill very rapidly down to 750° C., the tint is found to be quite blue.

If, on the other hand, this rate of cooling is reduced so that the pigment cools slowly from the calcining temperature to 750° C., the tint is found to be much less blue and more of a yellowish shade.

From observations made in controlling such a factor in the calcination of titanium pigments, I have been led to believe that these differences of tint are due to the reaction:

$$4TiO_2 \rightleftharpoons 2Ti_2O_3 + O_2$$

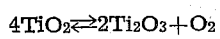

In other words, I believe that at elevated temperatures such as used for the calcination of titanium oxide hydrolysates, there is a dissociation of TiO₂ into Ti₂O₃ (titanium sesquioxide) and oxygen and as the Ti₂O₃ is blue, any such material remaining in a calcined pigment will give it a bluish subordinate tint. At temperatures below calcination, the equilibrium tends to revert from the right side of the equation to the left side. In other words, if any traces of Ti₂O₃ have been built up during calcination, they will revert in the presence of oxygen to TiO₂ if the calcined pigment is maintained for a sufficient length of time at intermediate temperature just below calcination.

At much lower temperatures, for instance below 750° C. the establishment of the equilibrium becomes so exceedingly slow that the reformation of TiO₂ from Ti₂O₃ practically does not occur any more, and any Ti₂O₃ present will remain unchanged.

I am offering this as an explanation of the phenomena discovered by me but it will be understood that my invention is not limited by this explanation.

In making use of my invention I can either produce directly a titanium dioxide pigment of any desired subordinate tint from a hydrolysate which, under ordinary calcination conditions, produce a pigment of an undesired tint, or I can take a finished pigment and by reheating it and controlling the cooling conditions obtain a pigment of another tint.

If, for instance, a certain hydrolysate has produced under standard calcination conditions a bluish tint and I desire to produce a pigment of a yellowish tint, I change the calcination conditions in such a manner that I increase the time of cooling of the calcined product from the calcining temperature down to about 750° C.

If my standard procedure produces a white pigment of a subordinate yellowish tint and I desire to produce one of a bluish tint, I merely decrease the time at which the calcined product is cooled to 750° C.

To illustrate this, in a procedure in which the calcined pigment after it came from the rotary calciner at 960° C. dropped through a distance of about three feet against a stream of cool air, its temperature fell to about 750° in a fraction of a second and the tint of the product was undesirably bluish, e. g., 3B. The procedure was then modified so that the pigment did not immediately drop through the same distance against a stream of air but was held for an average of 7½ minutes in a hot zone before the temperature had reached less than 750° C. Pigment produced in this manner had the desired yellowish tint of about, e. g., 1Y.

Similarly in procedures where with less cooling air the pigment was held for a substantial time in this temperature range of 960° to 750° C. and the pigment was on the yellowish side, I changed its tint by increasing the rate of air flow against the pigment whereby it was cooled in less than a few seconds to a temperature below 750° C. In such a case the pigment was of a slightly bluish tint as is desired for certain uses, e. g. 1B.

This control of the time of cooling of the hot pigment can be achieved in many various mechanical ways as will occur to anyone skilled in the art. The above operations were made on a continuous rotary calciner.

When practicing calcination by batch operation the cooling control may be achieved by rotation of the calciner after removal of the flame and admitting air into the chamber on to the tumbling pigment. In such instance the rate of admission of the air to the chamber will depend upon the size of charge and other factors which can only be definitely established by experience with the particular equipment being used. This will be easily determined by those skilled in the art.

In correcting the subordinate tint of a finished titanium dioxide pigment I heat it to calcination temperature, for instance, above 900° C. but preferably not above 1000° C.; if I desire a pigment of a yellowish subordinate tint I cool it slowly, in a few minutes, for instance 5 minutes or more down to about 750° C., or if I desire a bluish pigment I cool it rapidly in, for instance, a few seconds not more than 5 seconds to 750° C.

The temperature range from the calcination down to about 875 or 850° C. is the most important one to produce the yellowish tint and in processes involving delayed cooling for the production of such yellowish tint, the greater part of the time of the pigment is maintained between 950 and 750° C. should be spent above 850° C.

I claim:

1. A process for controlling the subordinate tint of a precipitated, calcined titanium oxide pigment, which comprises cooling said pigment in the presence of an oxygen-containing gas, after calcination at a temperature in excess of substantially 900° C., to a temperature of substantially 750° C., and, to obtain a pigment of desired bluish tint, effecting said cooling within a period of about 3-5 seconds, while to obtain a product of desired yellowish tint, effecting said cooling over a period of at least 5 minutes, but not to exceed about 7½ minutes.

2. A process for controlling the subordinate tint of a titanium oxide pigment to desired bluish condition, comprising calcining precipitated titanium oxide at a temperature in excess of substantially 900° C. and thence cooling the resultant pigment product over a period of about 3 seconds to a temperature of substantially 750° C. in the presence of an oxygen-containing gas.

3. A process for controlling the subordinate tint of a precipitated, calcined titanium oxide pigment to desired bluish condition which comprises cooling said pigment, in the presence of an oxygen-containing gas and after calcination thereof at a temperature in excess of substantially 900° C., to a temperature of substantially 750° C. and effecting said cooling over a period of about 5 seconds.

4. A process for controlling to yellowish condition the subordinate tint of a precipitated, calcined titanium oxide pigment, which comprises cooling said pigment in the presence of an oxygen-containing gas, after its calcination at a temperature in excess of substantially 900° C., to a temperature of substantially 750° C. and effecting said cooling within a time period ranging from not less than about 5 minutes to not to exceed about 7½ minutes.

5. A process for controlling to substantially yellowish condition the subordinate tint of a precipitated, calcined titanium oxide pigment which comprises cooling said pigment in the presence of an oxygen-containing gas and after calcination thereof at a temperature in excess of substantially 900° C., to a temperature of substantially 750° C., and effecting said cooling within an average time period of about 7½ minutes.

6. A process for controlling to substantially yellowish state the subordinate tint of a precipitated, calcined titanium oxide pigment which comprises cooling said pigment in the presence of an oxygen-containing gas and after calcination thereof at a temperature in excess of substantially 900° C., to a temperature of substantially 750° C. and effecting said cooling within a time period ranging from about 5 to 7½ minutes, the pigment being maintained above a temperature of substantially 850° C. during the greater part of said cooling time.

ROBERT M. McKINNEY.